(12) United States Patent
Lee (10) Patent No.: US 11,050,997 B2
(45) Date of Patent: Jun. 29, 2021

(54) DYNAMIC DISPLAY SYSTEM CAPABLE OF GENERATING IMAGES CORRESPONDING TO POSITIONS OF USERS

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 15/950,154

(22) Filed: Apr. 10, 2018

(65) Prior Publication Data
US 2018/0295353 A1    Oct. 11, 2018

Related U.S. Application Data

(60) Provisional application No. 62/483,472, filed on Apr. 10, 2017.

(51) Int. Cl.
| | |
|---|---|
| *H04N 13/239* | (2018.01) |
| *G06T 7/593* | (2017.01) |
| *H04N 13/271* | (2018.01) |
| *G06T 7/70* | (2017.01) |
| *H04N 13/366* | (2018.01) |
| *G06F 3/0346* | (2013.01) |
| *G06T 3/40* | (2006.01) |
| *H04N 13/00* | (2018.01) |
| *G06T 19/00* | (2011.01) |

(52) U.S. Cl.
CPC ......... *H04N 13/239* (2018.05); *G06F 3/0346* (2013.01); *G06T 3/40* (2013.01); *G06T 7/593* (2017.01); *G06T 7/70* (2017.01); *H04N 13/271* (2018.05); *H04N 13/366* (2018.05); *G06T 19/006* (2013.01); *G06T 2207/10012* (2013.01); *G06T 2207/10028* (2013.01); *H04N 2013/0081* (2013.01)

(58) Field of Classification Search
None
See application file for complete search history.

(56) References Cited

U.S. PATENT DOCUMENTS

| 9,613,461 | B2 * | 4/2017 | Hanai ................... G06F 1/1686 |
| 2012/0223967 | A1 * | 9/2012 | Mann ...................... G09G 5/00 |
| | | | 345/633 |
| 2012/0246223 | A1 * | 9/2012 | Newhouse .............. H04L 67/38 |
| | | | 709/203 |

(Continued)

FOREIGN PATENT DOCUMENTS

| CN | 106384365 A | 2/2017 |
| TW | I557708 B | 11/2016 |

*Primary Examiner* — Ryan M Gray
(74) *Attorney, Agent, or Firm* — Winston Hsu (57) ABSTRACT

A dynamic display system includes a display panel, a detection device, and a processor. The detection device is disposed at a same side of a housing of the dynamic display system as the display panel, and detects first three-dimensional coordinate information of a position of a user corresponding to the detection device. The processor is coupled to the display panel and the detection device. The processor converts the first 3D coordinate information to second 3D coordinate information of the position of the user corresponding to the display panel, and generates an image to be presented by the display panel according to the second 3D coordinate information.

24 Claims, 9 Drawing Sheets

(56) References Cited

U.S. PATENT DOCUMENTS

| | | | |
|---|---|---|---|
| 2013/0057543 A1* | 3/2013 | Mann | G06F 3/011 |
| | | | 345/419 |
| 2015/0009130 A1* | 1/2015 | Motta | G06F 3/012 |
| | | | 345/156 |
| 2016/0300340 A1* | 10/2016 | Gupta | G01B 11/002 |
| 2018/0005008 A1* | 1/2018 | Ahuja | G06K 9/00604 |
| 2018/0113593 A1* | 4/2018 | Ng | G06F 3/04815 |
| 2019/0087001 A1* | 3/2019 | Rawlinson | G06K 9/0061 |
| 2019/0171286 A1* | 6/2019 | Melman | G06F 3/013 |

\* cited by examiner

DYNAMIC DISPLAY SYSTEM CAPABLE OF GENERATING IMAGES CORRESPONDING TO POSITIONS OF USERS

CROSS REFERENCE TO RELATED APPLICATIONS

This non-provisional application claims priority of U.S. provisional applications U.S. 62/483,472, filed on Apr. 10, 2017, included herein by reference in its entirety.

BACKGROUND OF THE INVENTION

1. Field of the Invention

The present invention is related to a dynamic display system, especially, to a dynamic display system capable of generating images corresponding to the positions of users.

2. Description of the Prior Art

In prior art, when watching videos, most of the users are in a rather static environment, such as watching television in the living room, or watching movies in the theaters. In such static environment, since the seats are generally fixed, the distances between the audiences and the display panel are also fixed. In this case, the conditions for presenting images for the televisions and the projectors are rather simple, and the image content can be generated according to the predetermined positions.

However, as electronic devices become more and more powerful, users use electronic devices to watch videos or browse images more frequently. Since the users may have different habits when watching the display panels, the distances between the users and the display panels can be different as well. In addition, during the watching process, the user may move his/her position. Therefore, when the two-dimensional or three-dimensional images presented by an electronic device are shown with 3D visual effects, the image quality will drop if the presented images fail to adapt to the dynamic position of the user.

SUMMARY OF THE INVENTION

One embodiment of the present invention discloses a dynamic display system. The dynamic display system includes a display panel, a detection device, and a processor.

The detection device is disposed at a same side of a housing of the dynamic display system as the display panel, and detects first three-dimensional (3D) coordinate information of a position of a user corresponding to the detection device. The processor is coupled to the display panel and the detection device. The processor converts the first 3D coordinate information to second 3D coordinate information of the position of the user corresponding to the display panel, and generates an image to be presented by the display panel according to the second 3D coordinate information.

Another embodiment of the present invention discloses a dynamic display system. The dynamic display system includes a display panel, a detection device, and a processor.

The detection device is disposed at a same side of a housing of the dynamic display system as the display panel, and configured to detect a position of a user. The processor is coupled to the display panel and the detection device. The processor enlarges or shrinks at least part of content to be presented by the display panel according to a position change of the user detected by the detection device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
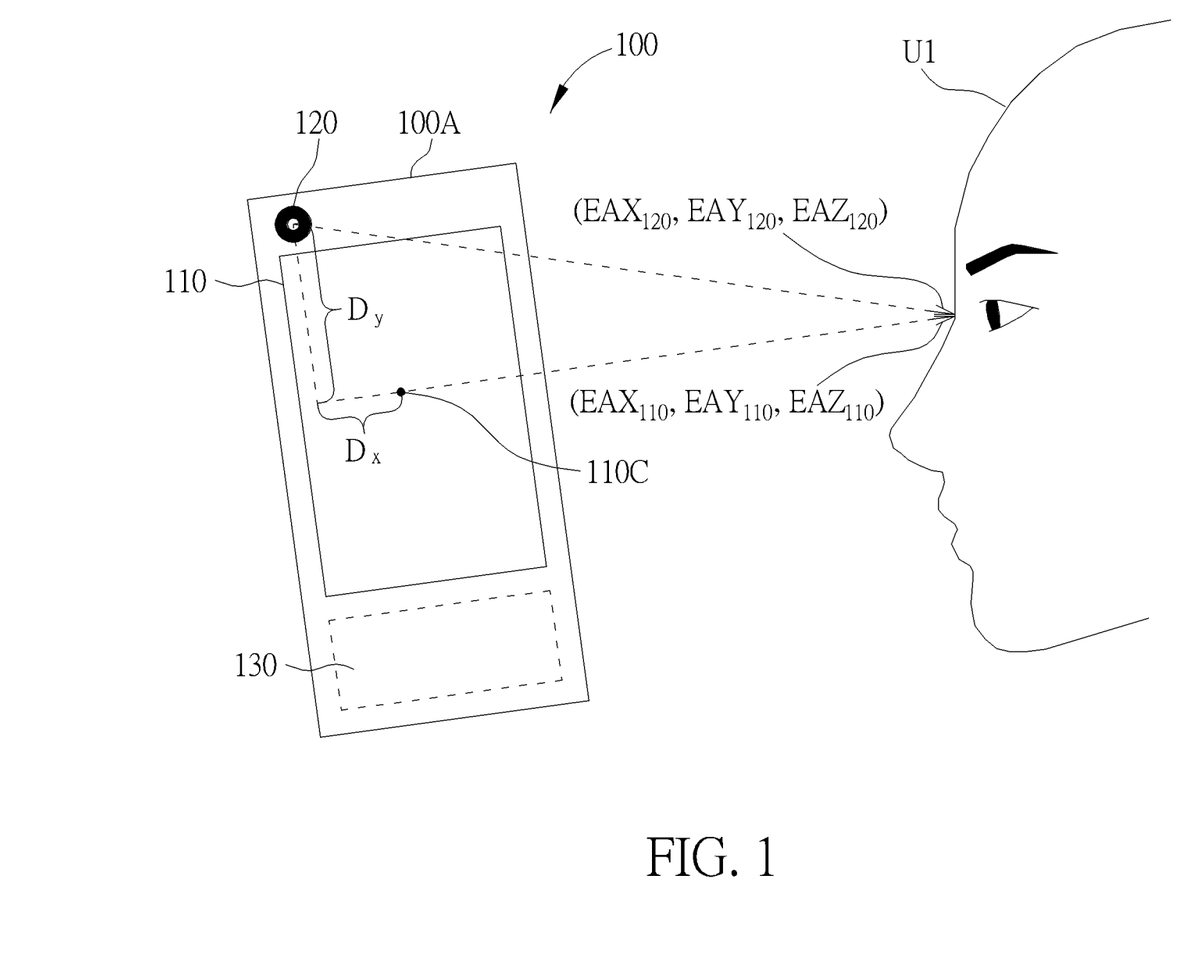
FIG. 1 shows a dynamic display system according to one embodiment of the present invention.

FIG. 1 shows a dynamic display system 100 according to one embodiment of the present invention. The dynamic display system 100 can, for example but not limited to, be an electronic device, such as a smart phone, a tablet, or a smart television. The dynamic display system 100 includes a display panel 110, a detection device 120, and a processor 130. The processor 130 is coupled to the display panel 110 and the detection device 120.

In the embodiment in FIG. 1, the detection device 120 and the display panel 110 can be disposed at the same side of the housing 100A of the dynamic display system 100 so the detection device 120 can detect the position of the user when the user watches the display panel 110, and the processor 130 would generate corresponding images according to the positions of the users.

For example, the detection device 120 can identify a specific part of the user U1, and detect the three-dimensional (3D) coordinate information of the user U1 corresponding to the detection device 120 according to the specific part of the user U1. In some embodiments, the dynamic display system 100 can assign the center point between the two eyes of the user U1 to be the specific part to be identified. In this case, the 3D coordinate information of the user U1 corresponding to the detection device 120 would include the 3D coordinates ($EAX_{120}$, $EAY_{120}$, $EAZ_{120}$) of the center point between the two eyes of the user U1. In some embodiments, the detection device 120 can include a depth capturing device and an image capturing device. Then the detection device 120 can detect the position of the eyes of the user U1 according to the features of eyes, such as colors and shapes. The depth capturing device can detect the distance between the eyes of the user U1 and the detection device 120 according to binocular vision, structured light, time of flight (ToF), or radars. In some other embodiments, the detection device 120 may only include the depth capturing device, and use the depth capturing device for object recognition and depth detection.

However, the present invention does not limit the detection device 120 to detect the eyes of the user U1. In some other embodiments, the detection device 120 can also recognize the head of the user U1 or other parts of the user U1 and detect the 3D coordinates of the head or other parts of the user U1 corresponding to the detection device 120. In addition, in some embodiments, the detection device 120 can also estimate the position change to generate the corresponding 3D coordinates according to the size change of the specific part of the user U1, such as the size change of the eyes or the head.

Generally, the disposed positions of the detection device 120 and the display panel 110 are different, and the user U1 is actually watching the display panel 110. Therefore, to learn how the user U1 is watching the display panel 110, the dynamic display system 100 can use the processor 130 to convert the position of the user U1 corresponding to the detection device 120 detected by the detection device 120 to the position of the user U1 corresponding to the display panel 110. In some embodiments, to assist the processor 130 to generate the position of the user U1 corresponding to the display panel 110, the processor 130 can set a reference point on the display panel 110 to represent the position of the display panel 130. For example, but not limited to, the processor 130 can set the display center 110C on the display panel 110 as the reference point. In some other embodiments, the processor 130 can also set any other parts of the display panel 110 as the reference point; however, to keep the explanation simple, the following embodiments will use the display center 110C as the reference point.

Since the detection device 120 and the display panel 110 are disposed at fixed locations on the housing 100A, the relative positions of these two are also fixed. For example, in FIG. 1, the horizontal distance Dx and the vertical distance Dy from the detection device 120 to the display center 110C of the display panel 110 are fixed. In this case, with the horizontal distance Dx and the vertical distance Dy, the processor 130 can convert the 3D coordinate information of the user U1 corresponding to the detection device 120 to the 3D coordinate information of the user U1 corresponding to the display center 110C of the display panel 110. That is, the processor 130 can convert the 3D coordinates ($EAX_{120}$, $EAY_{120}$, $EAZ_{120}$) with respect to the detection device 120 to the 3D coordinates ($EAX_{110}$, $EAY_{110}$, $EAZ_{110}$) with respect to the display center 110C.

In some embodiments, since the locations of the detection device 120 and the display panel 110 at the housing 100A are predetermined during the designing phase before manufacturing, the spatial parameters of these two can be stored in the processor 130 in advance. Although the locations of the detection device 120 and the display panel 110 may be shifted when the dynamic display system 100 is manufactured, the spatial parameters stored previously can still be applied if the locations are only shifted mildly. However, for applications with strict requirement for accuracy, the dynamic display system 100 can be calibrated for obtaining more accurate values.

Figure 2:
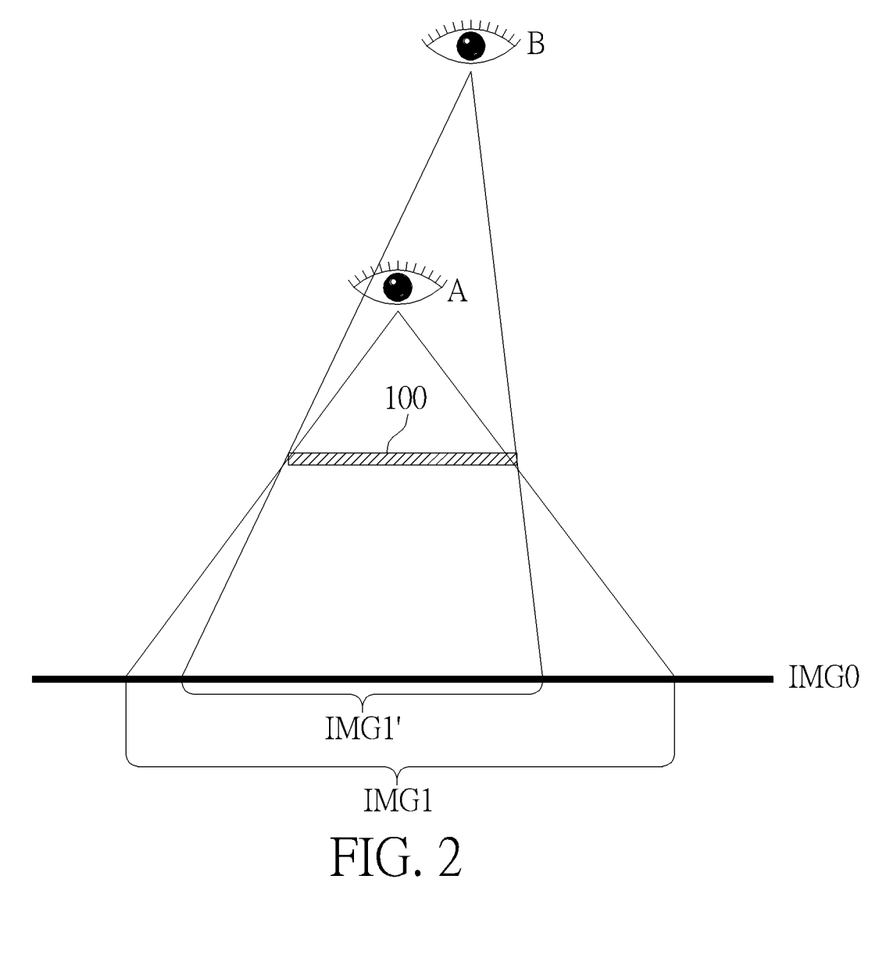
FIG. 2 shows a usage situation of the dynamic display system in FIG. 1.

After obtaining the 3D coordinate information of the user U1 corresponding to the display panel 110, for example, the 3D coordinates ($EAX_{110}$, $EAY_{110}$, $EAZ_{110}$) of the center point between the eyes of the user U1, the processor 130 can generate the image to be presented by the display panel 110 accordingly. For example, the processor 130 can determine the viewing field as the user U1 observing the display panel 110 and the distance between the user U1 and the display panel 110 according to the 3D coordinate information of the display panel 110. Also, the processor 130 can further determine the presenting ratio of the image to be presented according to the viewing field and the distance. FIG. 2 shows a usage situation of the dynamic display system 100 according to one embodiment of the present invention. In FIG. 2, the dynamic display system 100 is mainly used to present the content of the completed image IMG0, and the dynamic display system 100 can derive parts of the completed image IMG0 to generate the image to be presented by the display panel 110 according to the viewing field of the user U1 and the presenting ratio determined by the processor 130.

For example, when the center point between the eyes of the user U1 is at the location A, the processor 130 can determine the viewing field of the user U1 watching the display panel 110 and the distance between the user U1 and the display panel 110 according to the location A, and can derive the presenting ratio of the image to be presented by the display panel 110. And then, the processor 130 can derive parts of the completed image IMG0 to generate the image IMG1 for the display panel 110 according to the viewing field and the distance determined corresponding to the location A. Similarly, when the center point between the eyes of the user U1 is at the location B, the processor 130 can determine the presenting ratio according to the viewing field of the user U1 watching the display panel 110 and the distance between the user U1 and the display panel 110, and derive parts of the completed image IMG0 to generate the image IMG1' for the display panel 110 according to the viewing field and the distance determined corresponding to the location B.

In the embodiment shown in FIG. 2, the completed image IMG0 can be a planar image. However, in some other embodiments, the completed image IMG0 can also be a 360 degrees panoramic image. Since the dynamic display system 100 can generate images according to the positions of the users, it is able to provide images for the users in a more intuitive way. Furthermore, in some embodiments, the completed image IMG0 can be a plane image with depth information, a 360 degrees panoramic image with depth information, or a computer graphic image. That is, completed image IMG0 can be an image with depth information. In this case, the first image can be generated further according to depth information of the completed image and the position of the first user. In other words, the processor 130 will determine the viewing field, the presenting ratio, and what objects can be seen according to the position of the user U1 and the depth information of the completed image IMG0 for generating the images IMG1 and IMG1'.

Furthermore, in some embodiments, when the dynamic display system 100 displays icons through the display panel 110, the processor 130 can also display the icons according to the position of the user U1. For example, when the user U1 changes the viewing position, the icons may also be moved accordingly. Consequently, the visual effect similar to stereoscopy can be produced. If the icons are presented by 3D models having depth information, the processor 130 can further display the icons according to the position of the user U1 to further enhance the 3D visual effect. For example, when the user U1 looks at the icon from the front, the processor 130 can generate the font view of the icon, and when the user U1 looks at the icon from the side, the processor 130 can generate the side view of the icon including its frame. Consequently, when the user U1 changes his/her viewing position, the user U1 will sense the thickness of the icon, creating a visual effect of the icons sticking out.

The dynamic display system 100 can not only change the image content according to the change of the viewing position but can also enlarge at least parts of the content presented by the display panel 110 when the detection device 120 detects that the user U1 is moving away from the display center 110C in some embodiments.

For example, when content presented by the display panel 110 includes a picture, if the user U1 moves away from the display panel 110, then the processor 130 can enlarge the whole picture or parts of the picture, for example, the important parts of the picture containing useful information. That is, although the user U1 is moving further away from the display panel 110, the user U1 would still be able to see the content of the picture, which can be especially useful for seniors with presbyopia.

In addition, if the content presented by the display panel 110 includes texts, the processor 130 can enlarge the texts to help the user U1 to see the texts from a distance away. However, the present invention does not limit the way the processor 130 enlarges the content to be presented. For example, when enlarging texts, the processor 130 may enlarge the text content as an image directly, or the processor 130 can implement the enlargement by changing the font of the texts. Both ways should be within the scope of the present invention. In some embodiments, when the processor 130 enlarges the texts, it may reduce the number of texts that can be presented in a page to match with the size of the display panel 110

In some embodiments, the detection device 120 can determine whether the user U1 is moving away from the display panel 110 according to the depth change of the user U1, however, this is not to limit the present invention. In some other embodiments, the detection device 120 can also determine the distance to the user U1 according to the size change of the image of the specific part of the user U1 for enlarging or shrinking the content to be presented without using the detection device 120 to generate the depth information.

In addition, since the detection device 120 can generate the depth information of the objects, the detection device 120 can also be used to recognize some specific 3D identification object in some embodiments. The 3D identification object can be, for example, an accessory of the user or an object having special structure. When the detection device 120 identifies the 3D identification object, the processor 130 can unlock the dynamic display system 100 corresponding. Consequently, the unlock process of the dynamic display system 100 can be simplified.

In some embodiments, the display panel 110 can be a 2D image display panel. That is, the display panel 110 may not project different images for the left eye and the right eye of the user. In this case, the detection device 120 can detect the center point between the eyes of the user U1 as the reference point for detecting the position of the user U1. However, in some other embodiments, the display panel 110 may support 3D images, and the display panel 110 will generate different images for the left eye and the right eye of the user. In this case, the 3D coordinate information obtained by the detection device 120 can include the 3D coordinates of the left eye of the user U1 and the 3D coordinates of the right eye of the user U1. Also, the processor 130 will convert the 3D coordinates of the left eye and the right eye corresponding to the detection device 120 into the 3D coordinates of the left eye and the right eye corresponding to the display panel 110.

After the 3D coordinates of the left eye and the right eye of the user U1 corresponding to the display panel 110 are obtained, the processor 130 would know the positions of the eyes of the user U1, and can generate the images, including the left-eye image and the right-eye image, to be presented by the display panel 110 accordingly.

Figure 3:
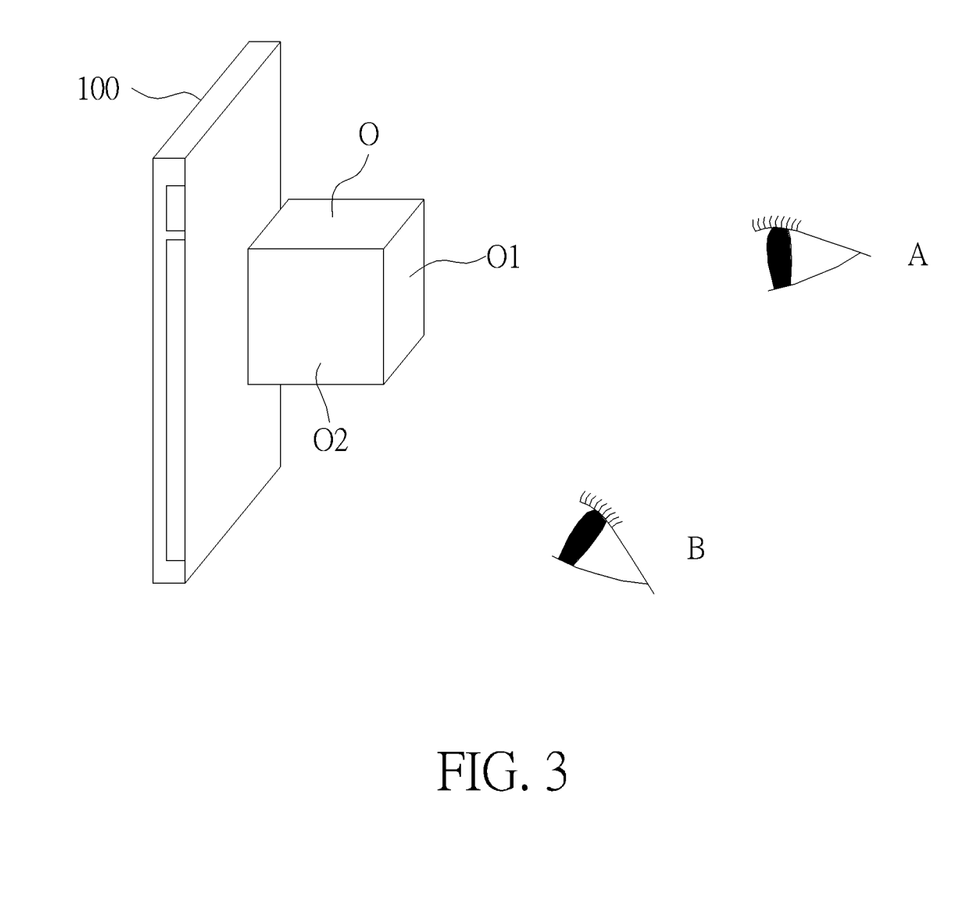
FIG. 3 shows a usage situation of the dynamic display system in FIG. 1.

Consequently, when the processor 130 displays the objects in the 3D image through the display panel 110, the user U1 will see different sides of the objects according to the positions of the user U1, producing a substantially holographic visual effect. FIG. 3 shows a usage situation of the dynamic display system 100. In FIG. 3, when the user U1 watches the display panel 110 from the position A, the processor 130 will generate the image of the side O1 of the object O. Also, when the user U1 watches the display panel 110 from the position B, the processor 130 will generate the image showing more side O2 of the object O and less side O1 of the object O.

In the embodiment shown in FIG. 3, the processor 130 can determine the observing angle according to the position of the user U1 and generate the corresponding images. That is, the object O is presented as if it exists in a relative space constructed by the dynamic display system 100. Therefore, the change of the position and direction of the dynamic display system 100 will not affect the image generated by the processor 130. That is, the processor 130 will update the image content only when the move of the dynamic display system 100 has caused change to the relative positions of the user U1 and the display panel 110. However, in some other embodiments, if the dynamic display system 100 also includes an inertial sensor, such as a gyro, then the dynamic display system 100 may also generate images showing different sides of the object according to its own angle variation.

Figure 4:
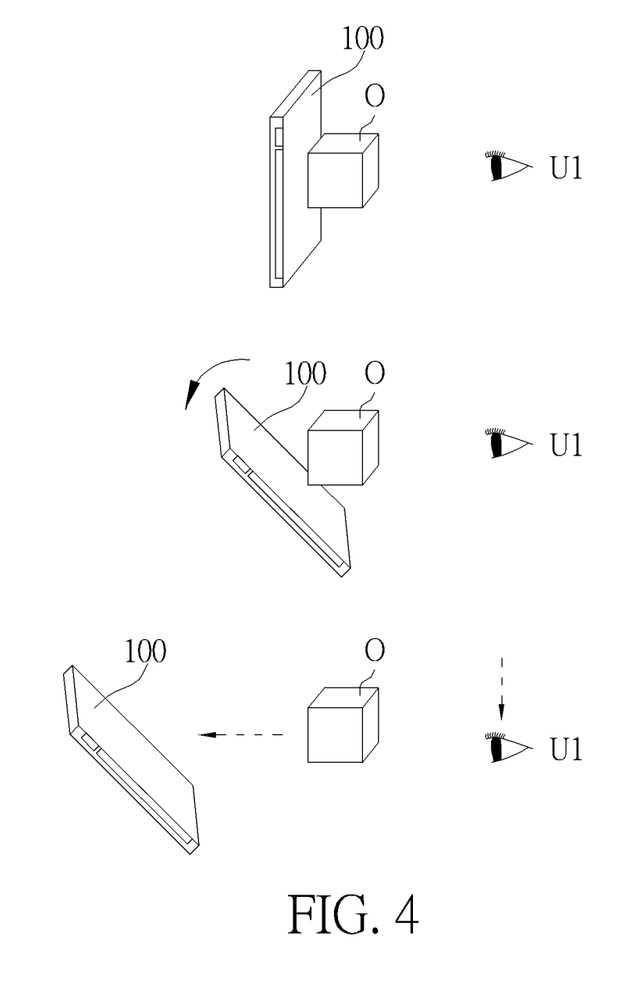
FIG. 4 shows a usage situation of the dynamic display system in FIG. 1.

FIG. 4 shows a usage situation of the dynamic display system 100 according to one embodiment of the present invention. In FIG. 4, the position of the user U1 remains the same, but as the position and the tilting angle of the dynamic display system 100 changes, the dynamic display system 100 can keep presenting the object O at the same position. That is, the object O is presented as if it exists in an absolute space, and will not change its position with the dynamic display system 100.

Figure 5:
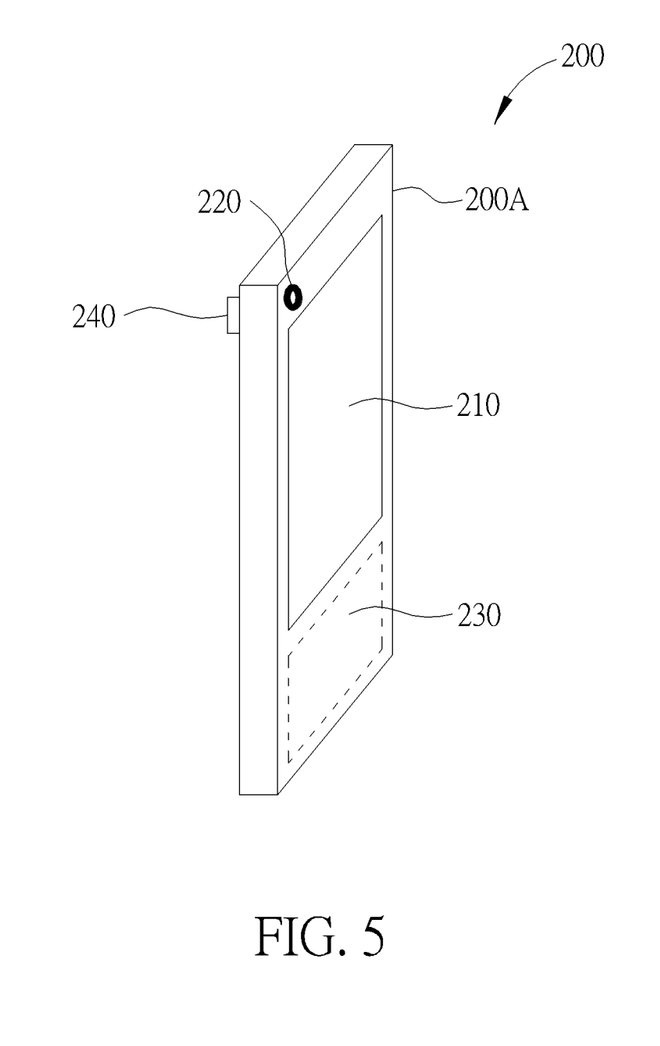
FIG. 5 shows a dynamic display system according to another embodiment of the present invention.

FIG. 5 shows a dynamic display system 200 according to another embodiment. The dynamic display system 200 includes a display panel 210, a detection device 220, and a processor 230. The dynamic display systems 100 and 200 have similar structures and can be operated with similar principles. In addition, the dynamic display system 200 can further include a depth capturing module 240. The depth capturing module 240 can be disposed on a side of the housing 200A opposite to a side of the housing the display panel 210 is disposed at so the depth capturing module 240 can capture the depth information behind the display panel 210. In this case, the processor 230 can generate augmented reality content according to the environmental depth information, and can generate the image to be presented by the display panel 210 according to the augmented reality content. In other words, the dynamic display system 200 can generate a virtual 3D world scene related to the real environment according to the environmental depth information. Since the virtual 3D world scene constructed by the dynamic display system 200 is related to the environmental depth information captured by the depth capturing module 240, the dynamic display system 200 can guide the user during the application and prevent the user from bumping into walls or entering dangerous zones.

Figure 6:
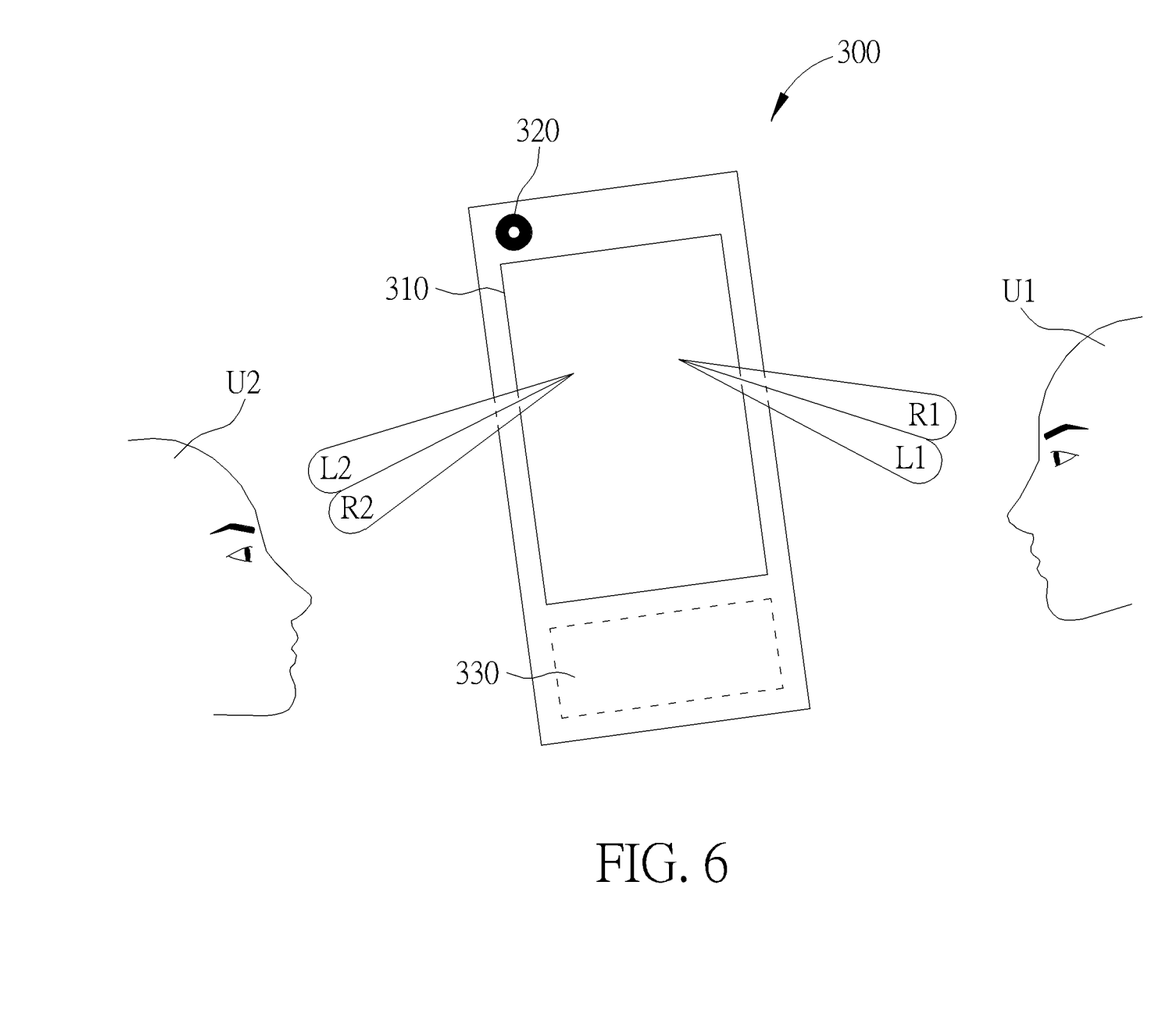
FIG. 6 shows a dynamic display system according to another embodiment of the present invention.

FIG. 6 shows a dynamic display system 300 according to another embodiment. The dynamic display systems 100 and 300 have similar structures and can be operated with similar principles. However, in the dynamic display system 300, the display panel 310 can be a multi-view 3D display panel. In this case, when there are multiple users watching the display panel 310 at the same time, the dynamic display system 300 can provide the images with corresponding viewing angles and viewing fields according to the positions of the users.

For example, in FIG. 6, the detection device 320 can detect the 3D coordinate information of the positions of the users U1 and U2 corresponding to the detection device 320, and the processor 330 can convert the 3D coordinate information of the positions of the users U1 and U2 corresponding to the detection device 320 to the 3D coordinate information of the positions of the users U1 and U2 corresponding to the display panel 310. In the present embodiment, the processor 330 can take the display center 310C as the reference point of the display panel 310. Furthermore, the 3D coordinate information obtained by the detection device 320 can include the 3D coordinates of the left eye and the right eye of the user U1 in the present embodiment. Consequently, the processor 330 can project the right-eye image R1 and the left-eye image L1 according to the positions of the eyes of the user U1, and project the right-eye image R2 and the left-eye image L2 according to the positions of the eyes of the user U2, improving the visual effect presented by the dynamic display system 300.

In some embodiments, when the users watch the multi-view 3D display panel, the users may watch with their bare eyes or with glasses matching with the display panel according to the system requirement. In addition, in some embodiments, the display panel 310 can provide images with different viewing angles for multiple users, or, the display panel 310 can also selectively provide images with single viewing angle for one single user.

Figure 7:
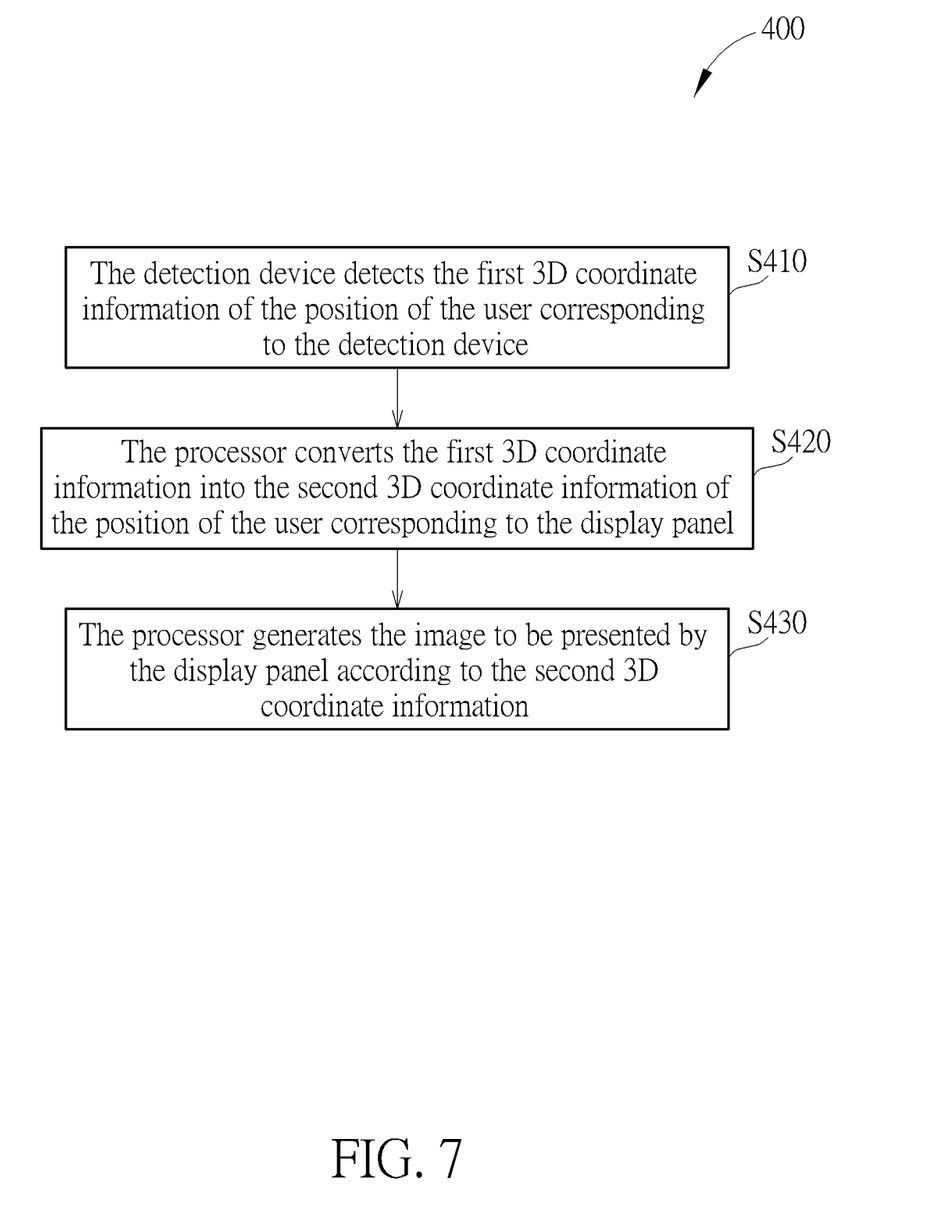
FIG. 7 shows a flow chart of a method for operating the dynamic display system in FIG. 1 according to one embodiment of the present invention.

FIG. 7 shows a flow chart of a method 400 for operating the dynamic display system 100 according to one embodiment of the present invention. The method 400 includes steps S410 to S430.

S410: the detection device 120 detects the first 3D coordinate information of the position of the user U1 corresponding to the detection device 120;

S420: the processor 130 converts the first 3D coordinate information into the second 3D coordinate information of the position of the user U1 corresponding to the display panel 110;

S430: the processor 130 generates the image to be presented by the display panel 110 according to the second 3D coordinate information.

In some embodiments, the detection device 120 can recognize a specific part of the user U1, and detect the 3D coordinate information of the user U1 corresponding to the detection device 120 according to the specific part of the user U1. That is, in step S410, the first 3D coordinate information generated by the detection device 120 can include the 3D coordinates of the specific part of the user U1. For example, the specific part of the user U1 can be eyes, the center point between the eyes or the head.

After the detection device 120 obtains the 3D coordinate information of the user U1 corresponding to the detection device 120, the processor 130 can convert it to the 3D coordinate information of the user U1 corresponding to the display panel 110, and generate the display image accordingly. For example, the processor 130 can determine the viewing field and the distance from the user U1 to the display panel 110 according to the second 3D coordinate information of the user U1 corresponding to the display panel 110, and further determine the presenting ratio of the image to be presented according to the viewing field and the distance. Consequently, the processor 130 would be able to derive parts of the completed image to generate the image to be presented by the display panel 110 according to the viewing field and the presenting ratio as shown in FIG. 2.

In addition, in some embodiments, the method 400 can further include the processor 130 enlarging the content presented by the display panel 110 when the detection device 120 detects that the user U1 is moving away from the display panel 110. Therefore, although the user U1 is moving away from the display panel 110, the user U1 would still be able to see the content of the picture, which can be especially useful for seniors with presbyopia. In some embodiments, the detection device 120 can determine whether the user U1 is moving away from the display panel 110 according to the depth change of the user U1, however, this is not to limit the present invention. In some other embodiments, the detection device 120 can also determine the distance to the user U1 according to the size change of the image of the specific part of the user U1 for enlarging or shrinking the content to be presented without using the detection device 120 to generate the depth information.

Furthermore, in some embodiments, the display panel 110 can support 3D images. That is, the display panel 110 can generate different images for the left eye and the right eye of the user synchronously to provide the stereoscopic visual effect. In this case, the 3D coordinate information obtained by the detection device 120 can include the 3D coordinates of the left eye of the user U1 and the 3D coordinates of the right eye of the user U1. Also, the processor 130 will generate the left-eye image and the right-eye image according to the 3D coordinates of the left eye and the right eye corresponding to the display panel 110 as shown in FIG. 3.

Figure 8:
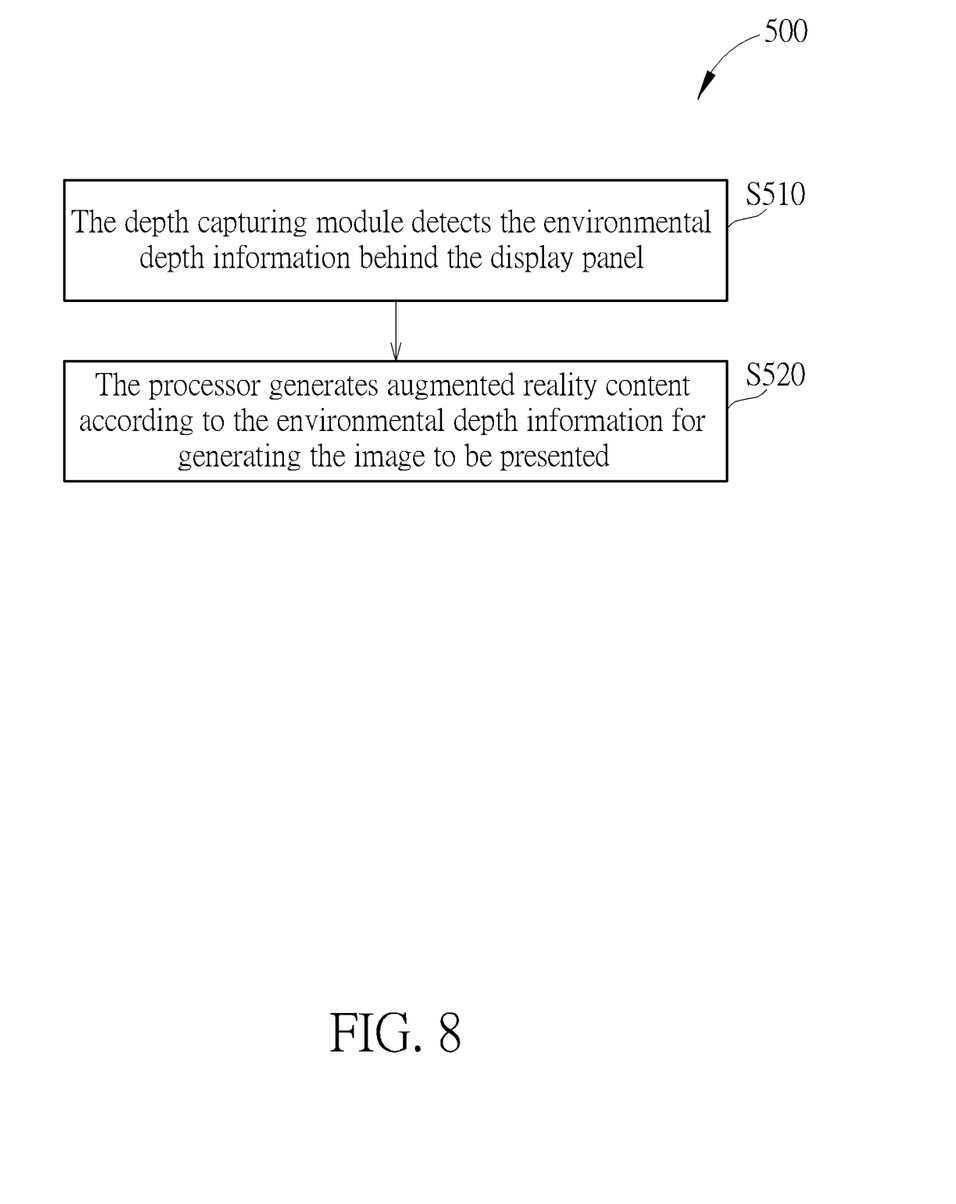
FIG. 8 shows a flow chart of the method for operating the dynamic display system in FIG. 5 according to one embodiment of the present invention.

FIG. 8 shows a flow chart of the method 500 for operating the dynamic display system 200 according to one embodiment of the present invention. The method 500 includes steps S510 to S520.

S510: the depth capturing module 240 detects the environmental depth information behind the display panel 210;

S520: the processor 230 generates augmented reality content according to the environmental depth information for generating the image to be presented.

In the present embodiment, the dynamic display system 200 can generate a virtual 3D world scene related to the real environment according to the environmental depth information generated by the depth capturing module 240. Therefore, the dynamic display system 200 can guide the user during the application and prevent the user from bumping into walls or entering dangerous zones. Besides, the method 400 can also be applied to the dynamic display system 200.

Figure 9:
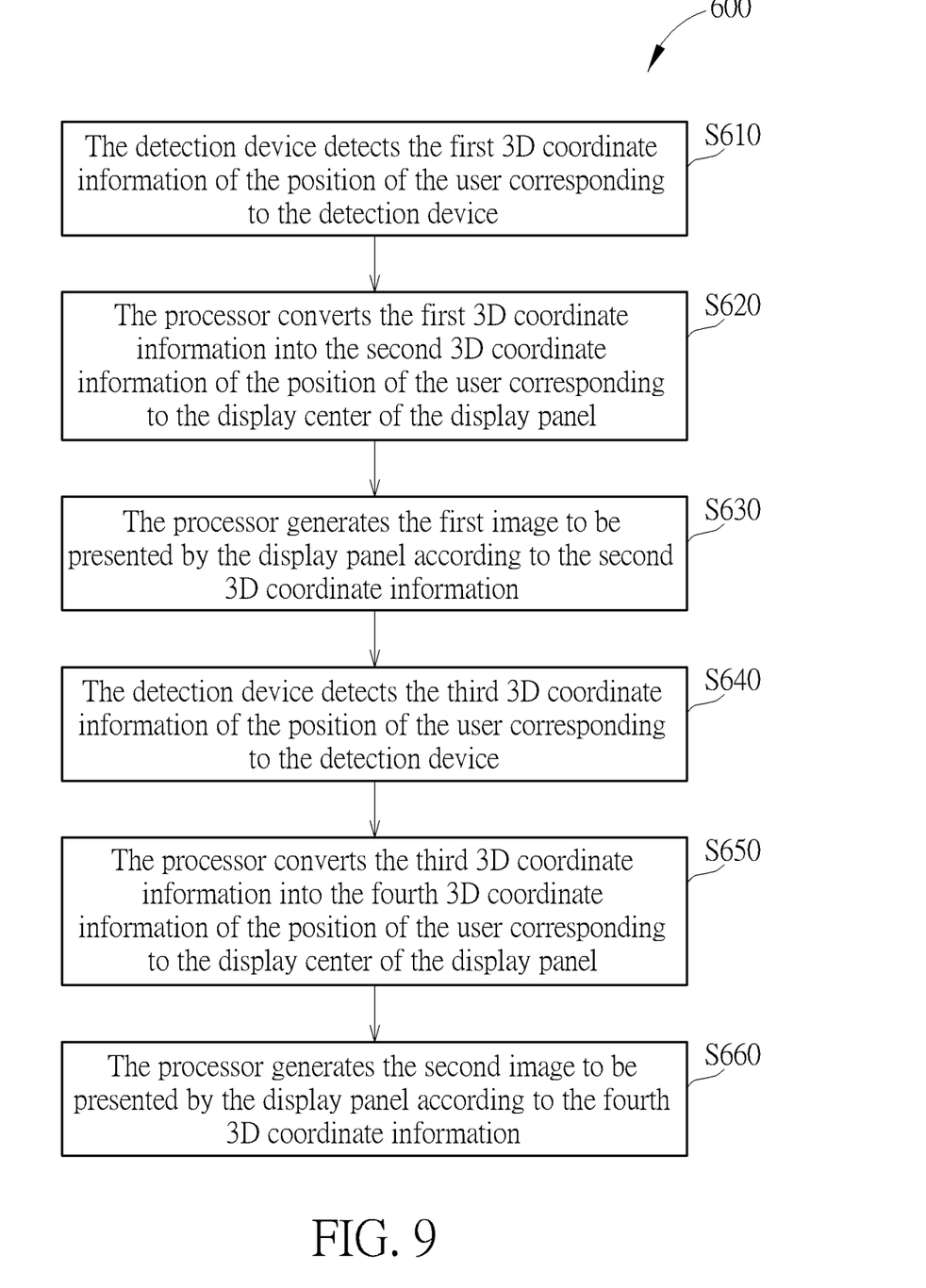
FIG. 9 shows a flow chart of the method for operating the dynamic display system in FIG. 6 according to one embodiment of the present invention.

FIG. 9 shows a flow chart of the method 600 for operating the dynamic display system 300 according to one embodiment of the present invention. The method 600 includes steps S610 to S660.

S610: the detection device 320 detects the first 3D coordinate information of the position of the user U1 corresponding to the detection device 320;

S620: the processor 330 converts the first 3D coordinate information into the second 3D coordinate information of the position of the user U1 corresponding to the display center 310C of the display panel 310;

S630: the processor 330 generates the first image to be presented by the display panel 110 according to the second 3D coordinate information;

S640: the detection device 320 detects the third 3D coordinate information of the position of the user U2 corresponding to the detection device 320;

S650: the processor 330 converts the third 3D coordinate information into the fourth 3D coordinate information of the position of the user U2 corresponding to the display center 310C of the display panel 310;

S660: the processor 330 generates the second image to be presented by the display panel 310 according to the fourth 3D coordinate information.

In the present embodiment, the display panel 310 can be a multi-view 3D display panel. Therefore, with the method 600, when there are multiple users watching the display panel 310 at the same time, the dynamic display system 300 can provide the images with corresponding viewing angles and viewing fields according to the positions of the users.

In summary, the dynamic display system and the method for operating the dynamic display system provided by the embodiments of the present invention can derive the position of the user corresponding to the display panel when the user is watching the display panel, and provide the 2D images or 3D images according to the position of the user, enriching the visual effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic display system comprising:
a display panel;
a detection device disposed at a same side of a housing of the dynamic display system as the display panel, and configured to detect first three-dimensional (3D) coordinate information of a position of a first user corresponding to the detection device; and
a processor coupled to the display panel and the detection device, and configured to execute 3D coordinate transformation to convert the first 3D coordinate information based on a first reference coordinate system provided by the detection device to second 3D coordinate information of the position of the first user based on a second reference coordinate system provided by the display panel according to a difference between a position of the detection device and a predetermined position of the display panel, and generate a first image to be presented by the display panel according to the second 3D coordinate information.

2. The dynamic display system of claim 1, wherein the detection device comprises a depth capturing device, or comprises a depth capturing device and an image capturing device.

3. The dynamic display system of claim 1, wherein the detection device detects the position of the first user according to a specific part of the first user, and the first 3D coordinate information comprises 3D coordinates of the specific part of the first user.

4. The dynamic display system of claim 3, wherein the specific part is eyes of the first user, a center point between the eyes, or a head of the first user.

5. The dynamic display system of claim 1, wherein the processor is configured to determine a viewing field of the first user when observing the display panel and a distance between the first user and the display panel according to the second 3D coordinate information, determine a presenting ratio of the first image according to the viewing field and the distance, and derive parts of a completed image to generate the first image according to the viewing field and the presenting ratio.

6. The dynamic display system of claim 5, wherein the completed image is a plane image or a 360 degrees panoramic image.

7. The dynamic display system of claim 5, wherein the completed image is a plane image with depth information, a 360 degrees panoramic image with depth information, or a computer graphic image.

8. The dynamic display system of claim 7, wherein the first image is generated further according to depth information of the completed image and the position of the first user.

9. The dynamic display system of claim 1, wherein when the detection device detects that the first user is moving away from the display panel, the processor enlarges content presented by the display panel.

10. The dynamic display system of claim 1, wherein:
the first 3D coordinate information comprises 3D coordinates of a left eye of the first user and 3D coordinates of a right eye of the first user; and
the first image comprises a left-eye image and a right-eye image.

11. The dynamic display system of claim 1, further comprising:
a depth capturing module disposed at a side of the housing opposite to the side of the housing the display panel is disposed at, and configured to detect environmental depth information behind the display panel;
wherein the processor is further configured to generate augmented reality content according to the environmental depth information for generating the first image.

12. The dynamic display system of claim 1, wherein:
the display panel is a multi-view 3D display panel;
the detection device is further configured to detect third 3D coordinate information of a position of a second user corresponding to the detection device; and
the processor is further configured to convert the third 3D coordinate information to fourth 3D coordinate information of the position of the second user corresponding to the display panel, and generate a second image to be presented by the display panel according to the fourth 3D coordinate information.

13. The dynamic display system of claim 1, wherein:
when the detection device identifies a 3D identification object, the processor unlocks the dynamic display system.

14. A dynamic display system comprising:
a display panel;
a detection device disposed at a same side of a housing of the dynamic display system as the display panel, and configured to detect a position of a first user; and
a processor coupled to the display panel and the detection device, and configured to enlarge or shrink at least part of content to be presented by the display panel according to a viewing field of the first user and a distance between the first user and the display panel, wherein the viewing field and the distance correspond to a position change of the first user detected by the detection device, the processor enlarges the at least part of content when the distance increases and shrinks the at least part of content when the distance decreases.

15. The dynamic display system of claim 14, wherein:
the detection device determines the position change of the first user according to a change in size of an image of a specific part of the first user or according to a depth change of the first user.

16. The dynamic display system of claim 14, wherein the detection device comprises a depth capturing device, or comprises a depth capturing device and an image capturing device.

17. The dynamic display system of claim 14, wherein the detection device detects the position of the first user according to 3D coordinates of a specific part of the first user.

18. The dynamic display system of claim 17, wherein the specific part is eyes of the first user, a center point between the eyes, or a head of the first user.

19. The dynamic display system of claim 14, wherein the processor is configured to determine a viewing field of the first user when observing the display panel and a distance between the first user and the display panel according to the position of the first user, determine a presenting ratio of an image according to the viewing field and the distance, and derive parts of a completed image to generate the image according to the viewing field and the presenting ratio.

20. The dynamic display system of claim 19, wherein the completed image is a plane image or a 360 degrees panoramic image.

21. The dynamic display system of claim 19, wherein the completed image is a plane image with depth information, a 360 degrees panoramic image with depth information, or a computer graphic image.

22. The dynamic display system of claim 21, wherein the first image is generated further according to depth information of the completed image and the position of the first user.

23. The dynamic display system of claim 14, further comprising:
a depth capturing module disposed at a side of the housing opposite to the side of the housing the display panel is disposed at, and configured to detect environmental depth information behind the display panel;
wherein the processor is further configured to generate augmented reality content according to the environmental depth information for generating an image.

24. The dynamic display system of claim 14, wherein:
when the detection device identifies a 3D identification object, the processor unlocks the dynamic display system.

* * * * *